US012650307B2

(12) United States Patent　　　　　(10) Patent No.:　US 12,650,307 B2
Burns et al.　　　　　　　　　　　　(45) Date of Patent:　Jun. 9, 2026

(54) PEDESTRIAN DEAD RECKONING USING DIFFERENTIAL GEOMETRIC PROPERTIES OF HUMAN GAIT

(71) Applicant: Apple Inc., Cupertino, CA (US)

(72) Inventors: Ryan K. Burns, Santa Clara, CA (US); Xiaoyuan Tu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 364 days.

(21) Appl. No.: 18/240,230

(22) Filed: Aug. 30, 2023

(65) Prior Publication Data

US 2024/0094000 A1　　Mar. 21, 2024

Related U.S. Application Data

(60) Provisional application No. 63/408,816, filed on Sep. 21, 2022.

(51) Int. Cl.
　　*G01C 21/12*　　　(2006.01)
　　*G01C 21/20*　　　(2006.01)
(52) U.S. Cl.
　　CPC ........... *G01C 21/12* (2013.01); *G01C 21/206* (2013.01)
(58) Field of Classification Search
　　None
　　See application file for complete search history.

(56) References Cited

U.S. PATENT DOCUMENTS

| | | | | |
|---|---|---|---|---|
| 9,721,383 | B1 * | 8/2017 | Horowitz | ................ G06T 17/10 |
| 10,768,708 | B1 * | 9/2020 | Sills | ......................... B25J 13/00 |
| 2012/0203453 | A1 * | 8/2012 | Lundquist | .............. G01C 21/16 |
| | | | | 701/434 |
| 2014/0343846 | A1 * | 11/2014 | Goldman | ........... G01C 21/1654 |
| | | | | 701/525 |
| 2015/0022447 | A1 * | 1/2015 | Hare | ....................... G06F 3/017 |
| | | | | 345/158 |

* cited by examiner

*Primary Examiner* — Lina Cordero
(74) *Attorney, Agent, or Firm* — Fish & Richardson P.C.

(57)　　　　　　ABSTRACT

In some embodiments, a method comprises: receiving acceleration data from a motion sensor of a mobile device carried by a user, the acceleration data represented by a space curve in a three-dimensional (3D) acceleration space, the space curve indicative of a cyclical vertical displacement of the user's center of mass accompanied by a lateral left and right sway of the center of mass when the user is stepping; computing a tangent-normal-binormal (TNB) reference frame from the acceleration data, the TNB reference frame describing instantaneous geometric and kinematic properties of the space curve over time; and computing a direction of travel of the user based on an orientation of a unit binormal (B) vector of the TNB reference frame in the 3D acceleration space, and computing a speed of the user based on a linear regression model applied to the kinematic properties of the TNB reference frame.

16 Claims, 11 Drawing Sheets

600

601 ⟩ RECEIVING ACCELERATION DATA FROM A MOTION SENSOR OF A MOBILE DEVICE CARRIED BY A USER, THE ACCELERATION DATA REPRESENTED BY A SPACE CURVE IN A THREE-DIMENSIONAL (3D) ACCELERATION SPACE, THE SPACE CURVE INDICATIVE OF A CYCLICAL VERTICAL DISPLACEMENT OF THE USER'S CENTER OF MASS ACCOMPANIED BY A LATERAL LEFT AND RIGHT SWAY OF THE CENTER OF MASS WHEN THE USER IS STEPPING

602 ⟩ COMPUTING TANGENT-NORMAL-BINORMAL (TNB) REFERENCE FRAME FROM THE ACCELERATION DATA (602), THE TNB REFERENCE FRAME DESCRIBING INSTANTANEOUS GEOMETRIC PROPERTIES OF THE SPACE CURVE OVER TIME, WHEREIN A TANGENT UNIT VECTOR (T) OF THE TNB REFERENCE FRAME IS TANGENT TO THE SPACE CURVE, A NORMAL UNIT VECTOR (N) OF THE TNB REFERENCE FRAME IS A NORMALIZED DERIVATIVE OF THE T UNIT VECTOR AND A BINORMAL UNIT VECTOR (B) OF THE TNB REFERENCE FRAME IS FORMED FROM A CROSS-PRODUCT OF THE T UNIT VECTOR AND THE N UNIT VECTOR

603 ⟩ COMPUTING A DIRECTION OF TRAVEL OF THE USER BASED ON AN ORIENTATION OF THE B UNIT VECTOR IN THE 3D ACCELERATION SPACE

MID-SWING

SMOOTHED INERTIAL
USER ACCELERATION
CURVE WHEN STEPPING

RIGHT STEP
LEFT STEP

INITIAL SWING
ACCELERATION

TERMINAL
SWING
DECELERATION

HEEL-STRIKE

301

HIGH-RATE DIRECTION
OF TRAVEL ESTIMATION

BODY
TURN

303

HEAD
TURNS

302

HEAD
TURNS

Y

X

RAW DoT
GAZE
FILTERED DoT

1 REVOLUTION ≈ 1 STEP

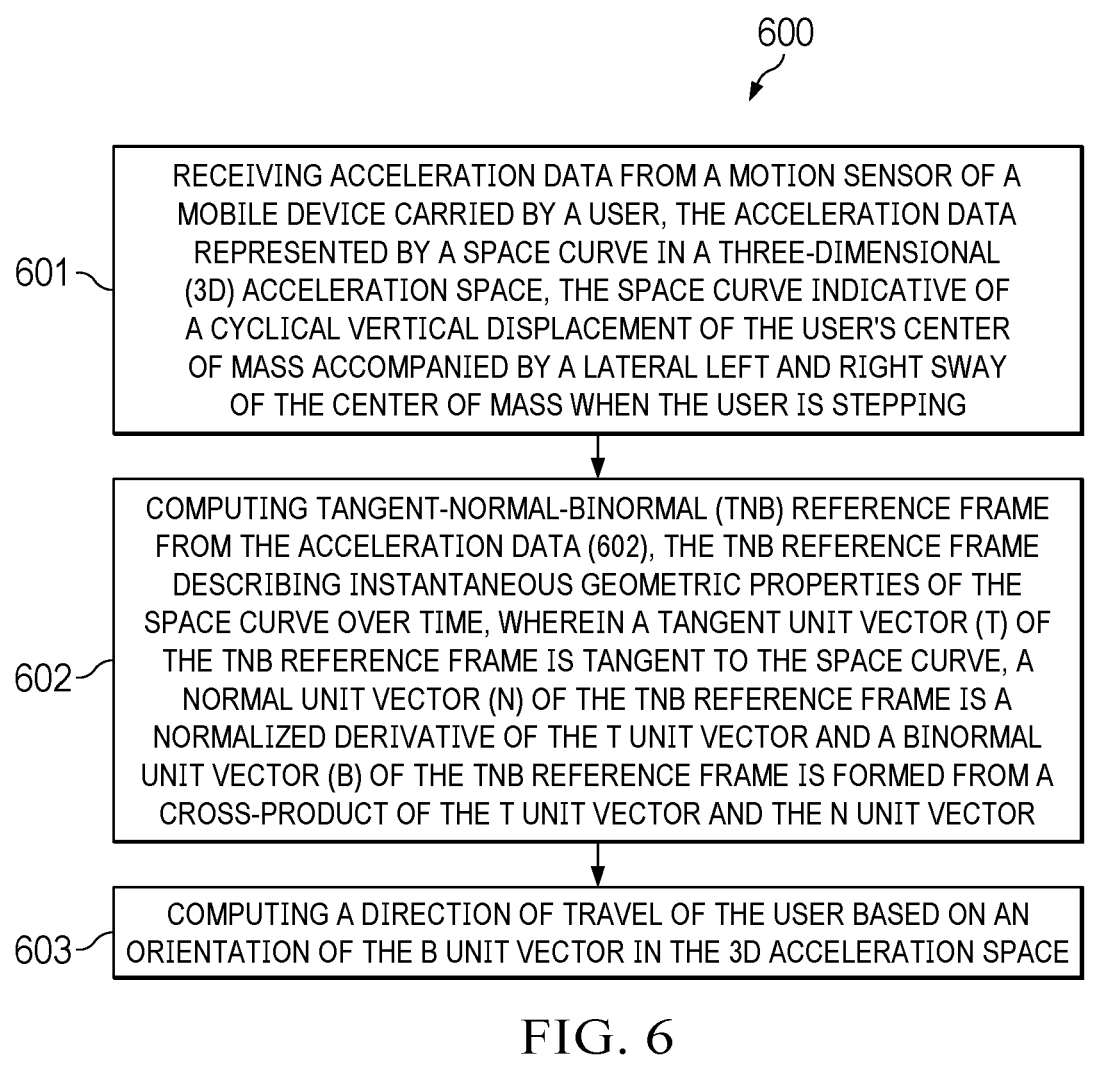

600

601 ⌇ RECEIVING ACCELERATION DATA FROM A MOTION SENSOR OF A MOBILE DEVICE CARRIED BY A USER, THE ACCELERATION DATA REPRESENTED BY A SPACE CURVE IN A THREE-DIMENSIONAL (3D) ACCELERATION SPACE, THE SPACE CURVE INDICATIVE OF A CYCLICAL VERTICAL DISPLACEMENT OF THE USER'S CENTER OF MASS ACCOMPANIED BY A LATERAL LEFT AND RIGHT SWAY OF THE CENTER OF MASS WHEN THE USER IS STEPPING

602 ⌇ COMPUTING TANGENT-NORMAL-BINORMAL (TNB) REFERENCE FRAME FROM THE ACCELERATION DATA (602), THE TNB REFERENCE FRAME DESCRIBING INSTANTANEOUS GEOMETRIC PROPERTIES OF THE SPACE CURVE OVER TIME, WHEREIN A TANGENT UNIT VECTOR (T) OF THE TNB REFERENCE FRAME IS TANGENT TO THE SPACE CURVE, A NORMAL UNIT VECTOR (N) OF THE TNB REFERENCE FRAME IS A NORMALIZED DERIVATIVE OF THE T UNIT VECTOR AND A BINORMAL UNIT VECTOR (B) OF THE TNB REFERENCE FRAME IS FORMED FROM A CROSS-PRODUCT OF THE T UNIT VECTOR AND THE N UNIT VECTOR

603 ⌇ COMPUTING A DIRECTION OF TRAVEL OF THE USER BASED ON AN ORIENTATION OF THE B UNIT VECTOR IN THE 3D ACCELERATION SPACE

FIG. 6

PEDESTRIAN DEAD RECKONING USING DIFFERENTIAL GEOMETRIC PROPERTIES OF HUMAN GAIT

CROSS-REFERENCE TO RELATED APPLICATIONS

This application claims priority to U.S. Provisional Patent Application No. 63/408,816, filed Sep. 21, 2022, the entire contents of which are hereby incorporated by reference.

TECHNICAL FIELD

This disclosure relates generally to pedestrian dead reckoning.

BACKGROUND

Pedestrian dead reckoning (PDR) is a technique implemented on mobile devices to estimate a current position and direction of travel (DoT) of a pedestrian typically in indoor environments where satellite signals are unavailable. An estimate of pedestrian position can be determined based on an estimate of pedestrian speed over time, which can be determined by counting steps over time. Estimates of DoT can be determined directly by a magnetometer if available and there are no strong external magnetic forces present that can introduce error into the magnetometer measurement. Mobile devices that do not have a magnetometer, or operate in an environment with strong external magnetic fields, can estimate DoT over a horizontal plane of acceleration signals. Existing solutions for estimating DoT, however, suffer from several limitations, such as the need for accurate step detection to segment motion data to extract relevant information to determine DoT per step, and the need to buffer data which introduces undesirable latency into the DoT calculation.

SUMMARY

Embodiments are disclosed for PDR using differential geometric properties of human gait.

In some embodiments, a method comprises: receiving, with at least one processor, acceleration data in an inertial frame of reference, the acceleration data output from a motion sensor of a mobile device carried by a user, the acceleration data represented by a space curve in a three-dimensional (3D) acceleration space, the space curve indicative of a cyclical vertical displacement of the user's center of mass accompanied by a lateral left and right sway of the center of mass when the user is stepping; computing, with the at least one processor, a tangent-normal-binormal (TNB) reference frame from the acceleration data, the TNB reference frame describing instantaneous geometric properties of the space curve over time, wherein a unit tangent vector (T) of the TNB reference frame is tangent to the space curve, a unit normal vector (N) of the TNB reference frame is a normalized derivative of the T vector and a unit binormal vector (B) of the TNB reference frame is formed from a cross-product of the T vector and the N vector; and computing, with the at least one processor, a direction of travel of the user based on an orientation of the B unit vector in the 3D acceleration space.

In some embodiments, the method further comprises smoothing the acceleration data prior to computing the TNB reference frame.

In some embodiments, the acceleration data is smoothed by a low-pass filter.

In some embodiments, computing a direction of travel further comprises rotating, with the at least one processor, the unit binormal vector by 90 degrees in a horizontal plane of an inertial frame of reference.

In some embodiments, the TNB reference frame possesses kinematic properties and the method further comprises estimating speed of the user based on a statistical model applied to the kinematic properties of the TNB reference frame.

In some embodiments, the kinematic properties include a curvature rotation rate that indicates in-plane rotation rates of the space curve.

In some embodiments, the kinematic properties include a torsion rotation rate that indicates out-of-plane roll rotation of the space curve.

In some embodiments, a system comprises: at least one motion sensor; at least one processor; memory storing instructions that when executed by the at least one processor, cause the at least one processor to perform operations comprising: receiving acceleration data from a motion sensor of a mobile device carried by a user, the acceleration data represented by a space curve in a three-dimensional (3D) acceleration space, the space curve indicative of a cyclical vertical displacement of the user's center of mass accompanied by a lateral left and right sway of the center of mass when the user is stepping; computing a tangent-normal-binormal (TNB) reference frame from the acceleration data, the TNB reference frame describing instantaneous geometric properties of the space curve over time, wherein a unit tangent vector (T) of the TNB reference frame is tangent to the space curve, a unit normal vector (N) of the TNB reference frame is a normalized derivative of the T vector and a unit binormal vector (B) of the TNB reference frame is formed from a cross-product of the T vector and the N vector; and computing a direction of travel of the user based on an orientation of the B vector in the 3D acceleration space.

In some embodiments, the statistical model is a linear regression model and the kinematic properties include rotation rates of the TNB reference frame.

In some embodiments, the system is embedded in an at least one earbud worn in the ear of a user.

Particular embodiments described herein provide one or more of the following advantages. The disclosed embodiments allow PDR parameters, such as user position, speed and DoT, to be robustly and continuously determined on mobile devices in real-time without introducing additional complexity or latency in PDR computations.

BRIEF DESCRIPTION OF THE DRAWINGS

FIG. 6 is a flow diagram of a process for determining PDR parameters using geometrical and kinematic properties of TNB frames, as described in reference to FIGS. 1-5.

DETAILED DESCRIPTION

Example System

The disclosed embodiments include a low-power PDR technique for use in pedestrian navigation and context or location-based user intelligence on mobile devices (e.g., smartphones, smartwatches, headsets, earbuds). The disclosed embodiments include an inertial sensor based, robust, real-time estimation of pedestrian walking direction, by leveraging a novel kinematic motion representation based in differential geometry. More specifically, a user's stepping motion is captured by an inertial measurement unit (IMU) of a mobile device and represented in moving TNB reference frames. The unit binormal vector (B) of the TNB frame captures a local and instantaneous unit rotation axis of a user's center of mass (CoM) forward motion, which is orthogonal to, and 90 degrees offset from, the unit direction of stepping. The axis captured by the B vector is the same as the axis over which an inverted pendulum revolves (see FIG. 1A). In some embodiments, TNB frames are calculated from motion data at the same rate as motion data (e.g., acceleration data sampled between 50-100 Hz).

Conceptual Overview

Figure 1A:
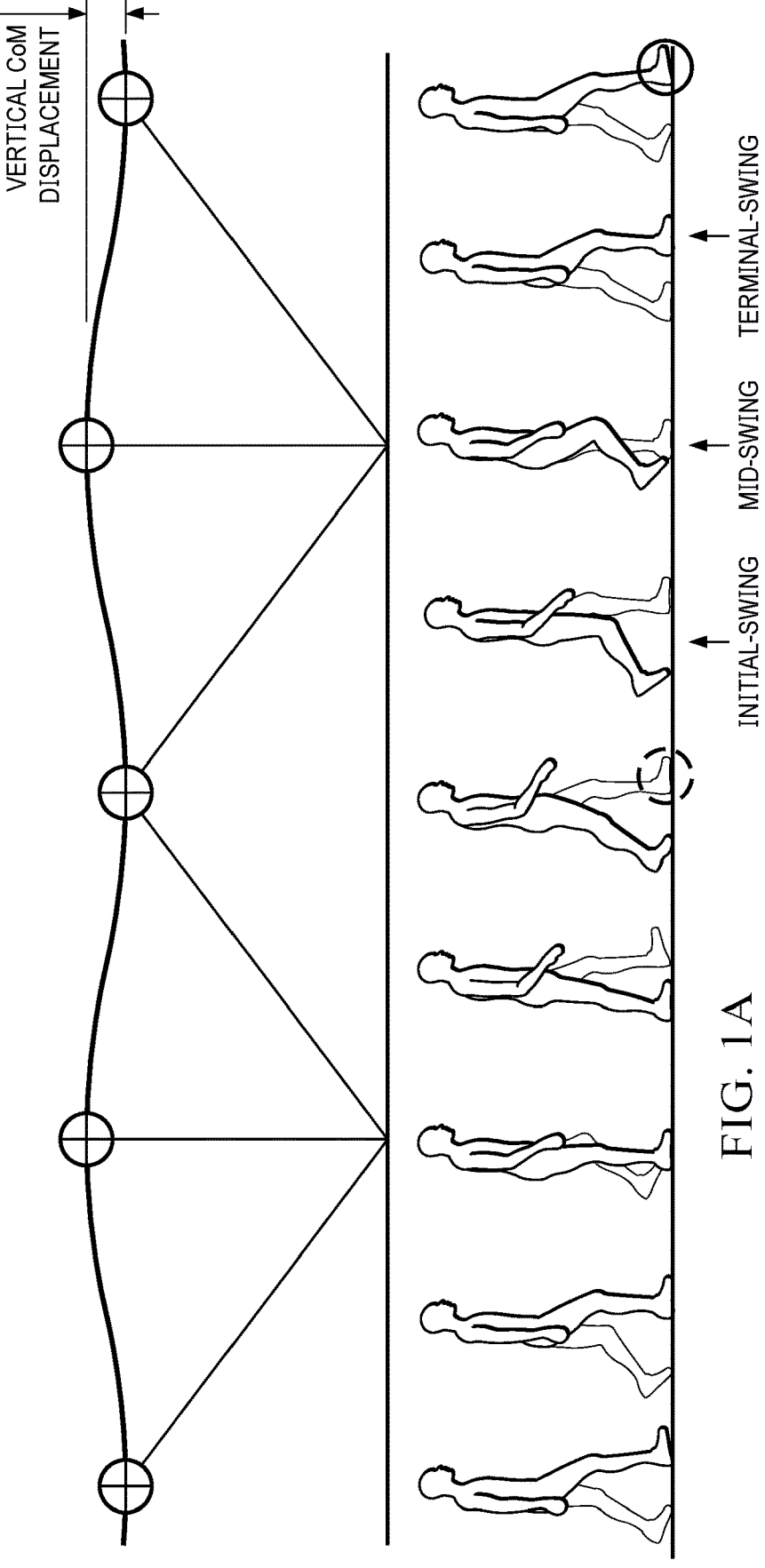
FIG. 1A illustrates vertical oscillation at the user's center of mass (CoM) while the user is walking, according to some embodiments.
Figure 1B:
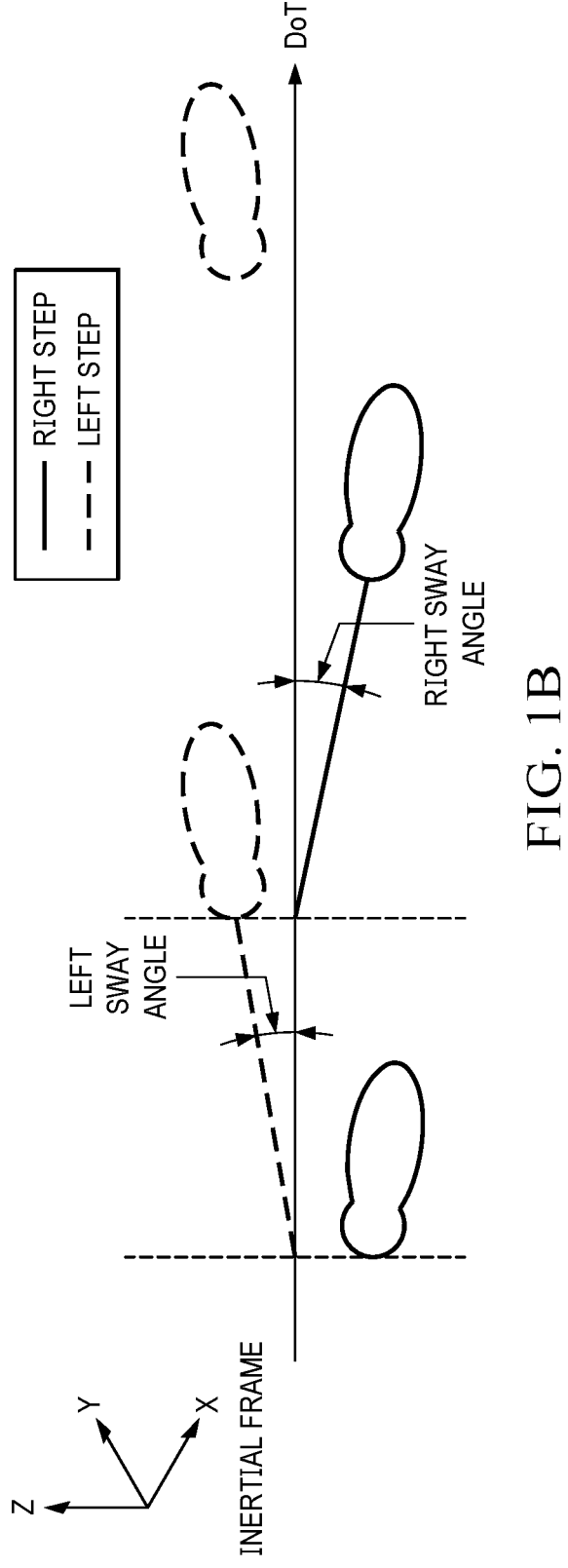
FIG. 1B illustrates a swaying pattern that occurs while the user is walking, according to some embodiments.

FIG. 1A illustrates vertical oscillation at the user's CoM during a human gait, according to some embodiments. The human gait is a cyclic motion of the alternating foot, which is reflected in how the CoM is carried forward, while going through an upward and downward sinusoidal motion which can be described in phases as: initial-swing, mid-swing and terminal-swing. The vertical oscillation at the CoM is accompanied by a lateral left and right sway, when stepping, as shown in FIG. 1B. These vertical and swaying motions together form a repeatable pattern that can be observed from motion sensors (e.g., accelerometers) coupled to the human body, such as earbuds worn on the head or a smartphone in a pocket or a smartwatch worn on the wrist.

Figure 1C:
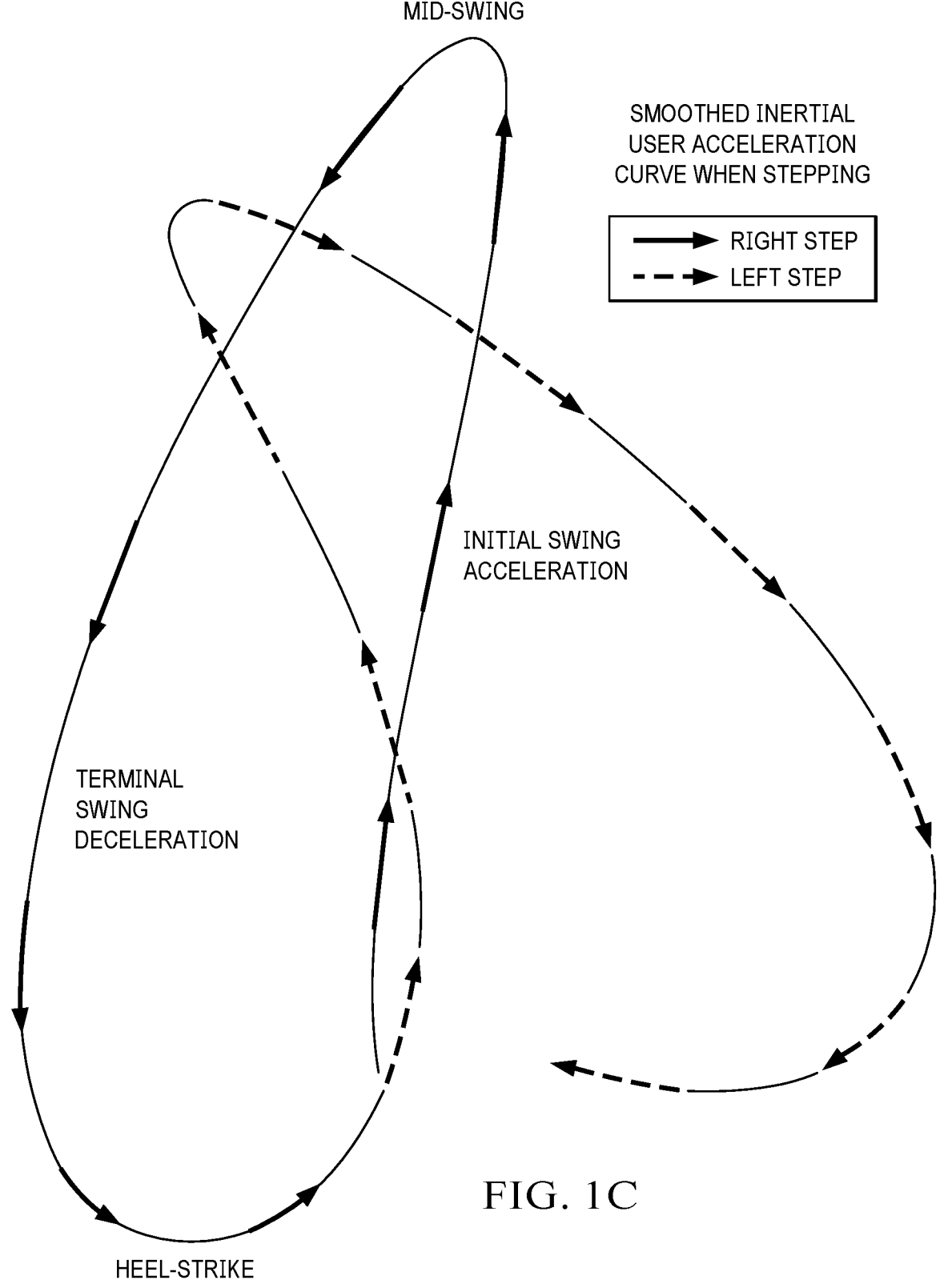
FIG. 1C illustrates a butterfly space curve that is created when a user is walking, according to some embodiments.

As shown in FIG. 1C, the repeatable pattern, captured by smoothed (e.g., low-pass filtered) user acceleration in an inertial reference frame, can be represented as an acceleration space curve in three-dimensional (3D) space and looks like a "butterfly," where each step by the user traces out one "wing" of the butterfly as the step is happening, as indicated by the directions of the arrows. A key observation from the butterfly pattern is that each wing (one for the left step and one for the right step) is aligned with the DoT for that step.

Existing approaches for PDR, such as principal component analysis (PCA), attempt to fit a plane to each wing, thereby providing a DoT estimate per step. The enclosed embodiments, however, represent a different approach by representing the DoT using the axis of rotation of a particle traveling along the wings of the butterfly pattern as steps are occurring, thus enabling a sub-step resolution for DoT estimates in real-time at the sample rate of the input motion data.

Figure 2A:
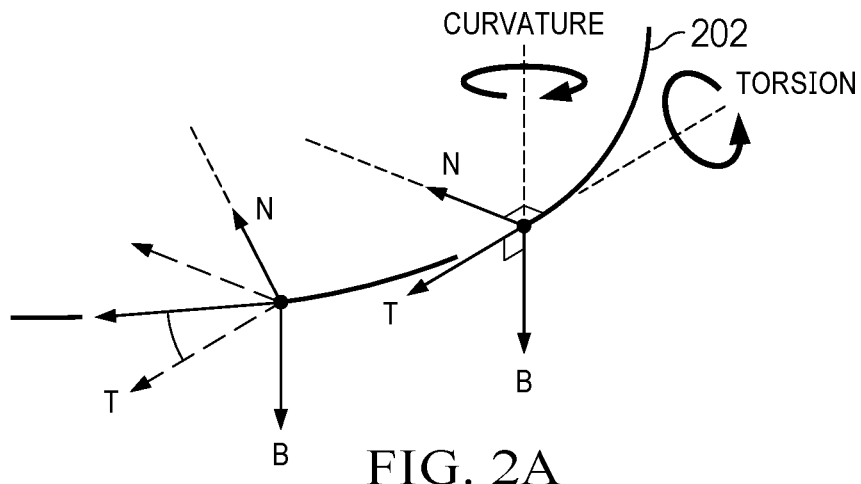
FIGS. 2A and 2B illustrate tangent-normal-binormal (TNB) reference frames, according to some embodiments.

FIG. 2A illustrates representing acceleration space curves in three dimensions using TNB reference frames, according to some embodiments. A TNB reference frame is defined by its basis vectors which includes a unit tangent (T) vector that is tangent to the curve and points in the direction of motion, a unit normal (N) vector that is a normalized derivative of the T vector, and a unit binormal vector (B) that is the cross-product of the T and N vectors to complete a right-handed coordinate system. The B vector captures the instantaneous stepping direction with a 90° offset in a horizontal plane of an inertial frame of reference, where the horizontal plane (also referred herein as the "X-Y" plane) is the walking surface, which is perpendicular to the gravity vector. Given an acceleration space curve a(t), the unit T, N, B vectors of a TNB reference frame are given by:

$$T(t) = \frac{a'(t)}{\|a'(t)\|}, \tag{1}$$

$$N(t) = \frac{T'(t)}{\|T'(t)\|}, \tag{2}$$

$$B(t) = T(t) \times N(t). \tag{3}$$

The TNB reference frame is a moving frame that describes the geometric properties of an acceleration space curve and also possesses kinematic properties. For example, the TNB reference frame characterizes the rotational dynamics of the CoM of vertical oscillation (see FIG. 1A) as it evolves in real-time in 3D acceleration space. This continuous-time parameterization is intrinsic to the acceleration space curve. In the context of a 3D space curve, the TNB reference frame uniquely defines a curve, up to arc length scaling, over a 3-point sliding window. Kinematic properties of the TNB reference frame (as it traces the acceleration space curve) include curvature and torsion rotation rates of the TNB frame. This attention to the temporal structure of the stepping motion represents a novel improvement over existing solutions, such as PCA for plane fitting.

As shown in FIG. 2A, the curvature rotation rate (dropping vector notation) is given by:

$$\dot{T} = \frac{d}{dt}T, \tag{4}$$

which captures rotation motion in the local plane of curvature (osculating plane) defined by T and N, and the torsion rotation rate is given by:

$$\dot{N} = \frac{d}{dt}N, \tag{5}$$

which captures the roll of the curve out of the local plane of curvature.

Figure 2B:
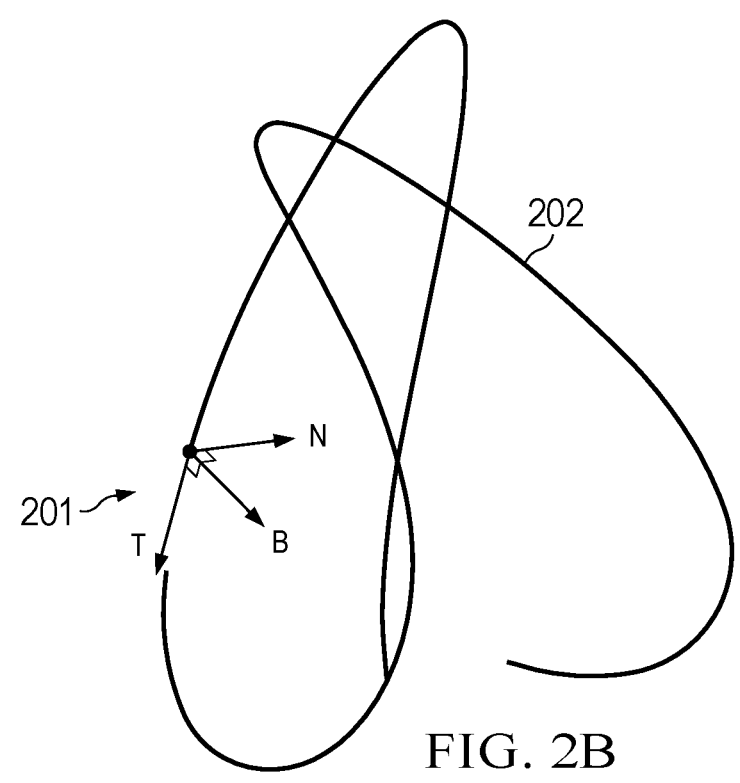

Referring to FIG. 2B, each TNB frame occupies a small planar patch 201 in which the space curve 202 is locally embedded. A sequence of such local patches defined by the T and N vectors of the TNB frame can be averaged together (hereinafter, a "sub-step"), to determine the DoT of the user. Using a TNB reference frame to determine DoT provides the benefits of a short time window and high sampling rate through its ability to recover quickly from transient motion disturbances (e.g., non-pedestrian motions layered onto the walking signature, such as head turning), in contrast to existing PCA methods which produce a single fit per step. Following such a local perturbation (e.g., head turning), existing PCA methods which produce a single fit per step would have to wait for two well-captured steps consecutively, such that the average left- and right-skewed planar fits could be resolved into a forward travel direction.

Figure 3A:
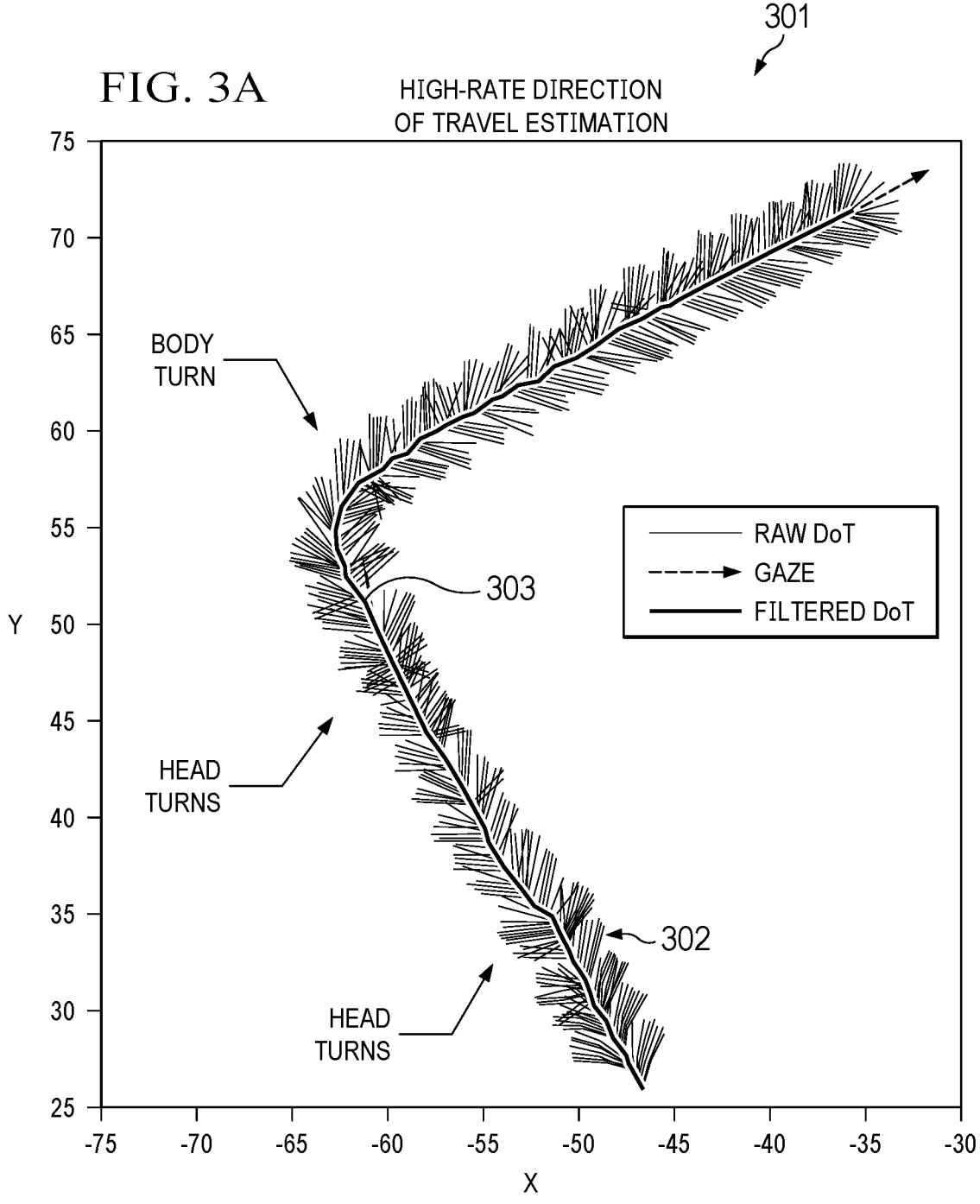
FIGS. 3A and 3B illustrate using TNB frames for DoT estimation, according to some embodiments.

FIG. 3A is a graph illustrating using TNB frames for DoT estimation, according to some embodiments. The plots on the graph include instantaneous gaze vectors 301, raw DoT vectors 302 and smoothed DoT vectors 303 over time. The raw instantaneous DoT vectors 302 are computed from acceleration signals generated by accelerometers embedded in ear buds worn by the user. More particularly, the raw instantaneous DoT vectors are determined by averaging the B vectors of TNB reference frames over time where each B vector is rotated by 90 degrees in the horizontal (X-Y) plane. In some embodiments, the gaze vectors 301 are derived from the attitude of the mobile device output by the IMU, composed with a nominal/population-averaged headset-to-face frame transformation. The raw DoT vectors 302 include the expected left and right swaying in the walking plane (see FIG. 1B), which is smoothed using a low-pass (LPF) to generate the smoothed DoT vectors 303.

Note from FIG. 3A that when the gaze vectors 301 indicate that the user's head turns the smoothed DoT vectors 303 momentarily distort but then recover quickly. This distortion is due to a momentary contribution of centripetal acceleration to the raw DoT vectors due to rotation of the user's head. Also note that smoothed DoT vectors 303 change direction when the gaze vectors 301 indicate that the user has turned their body as expected. Such a quick recovery from perturbations is not possible with existing PCA solutions.

Figure 3B:
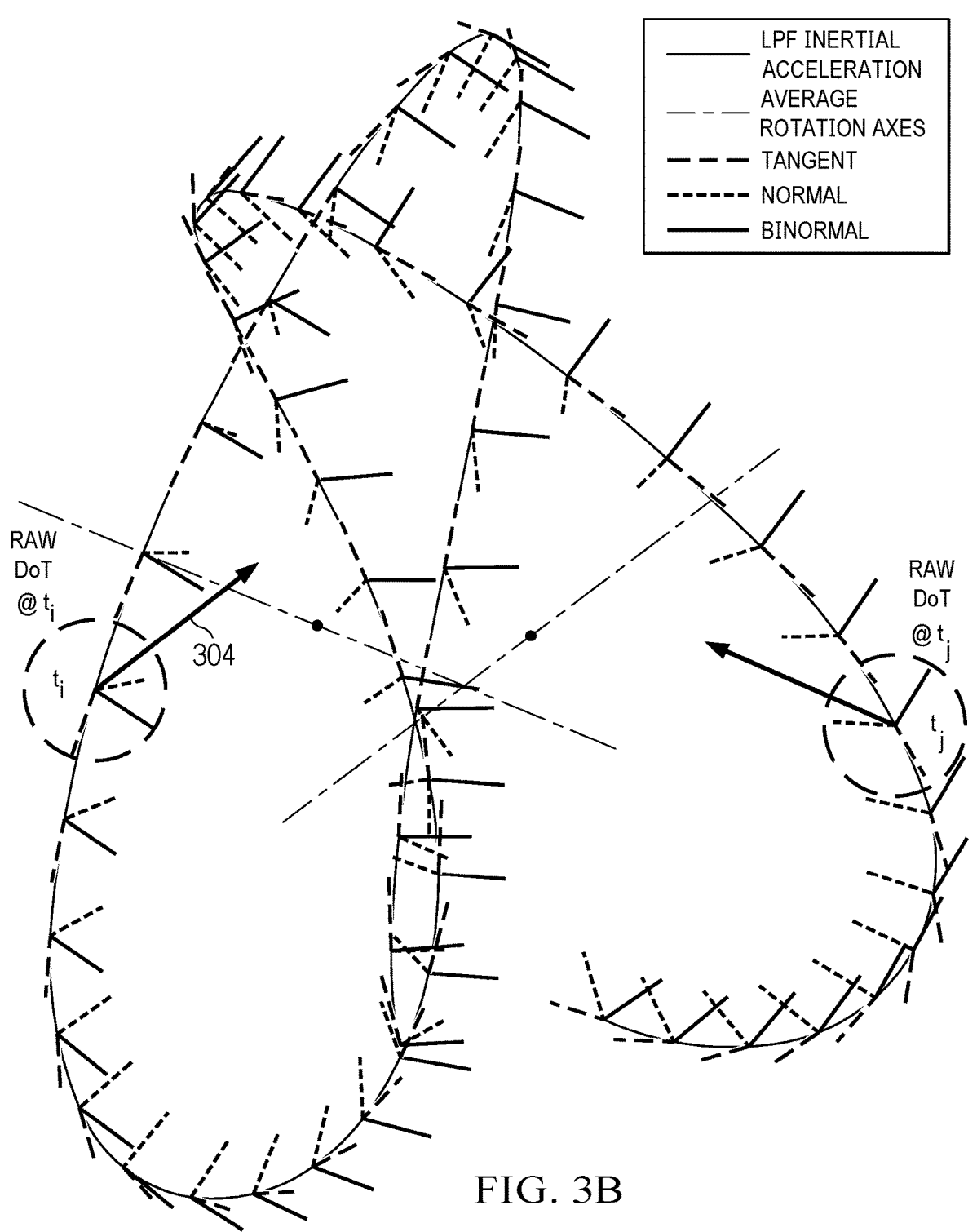

FIG. 3B shows instantaneous TNB frames on the butterfly space curve with low-pass filtered inertial acceleration, average rotation axes and T, N and B unit vectors, according to an embodiment. The raw instantaneous DoT vectors 301 are computed by rotating the B vectors 304 by 90° in the horizontal (X-Y) plane. The rotated instantaneous B vectors 304 are smoothed using a LPF to generate the smoothed DoT vectors 303 shown in FIG. 3A. As can be observed from FIGS. 3A and 3B, the TNB frames allow for robust, continuous and real-time DoT estimates.

Figure 4A:
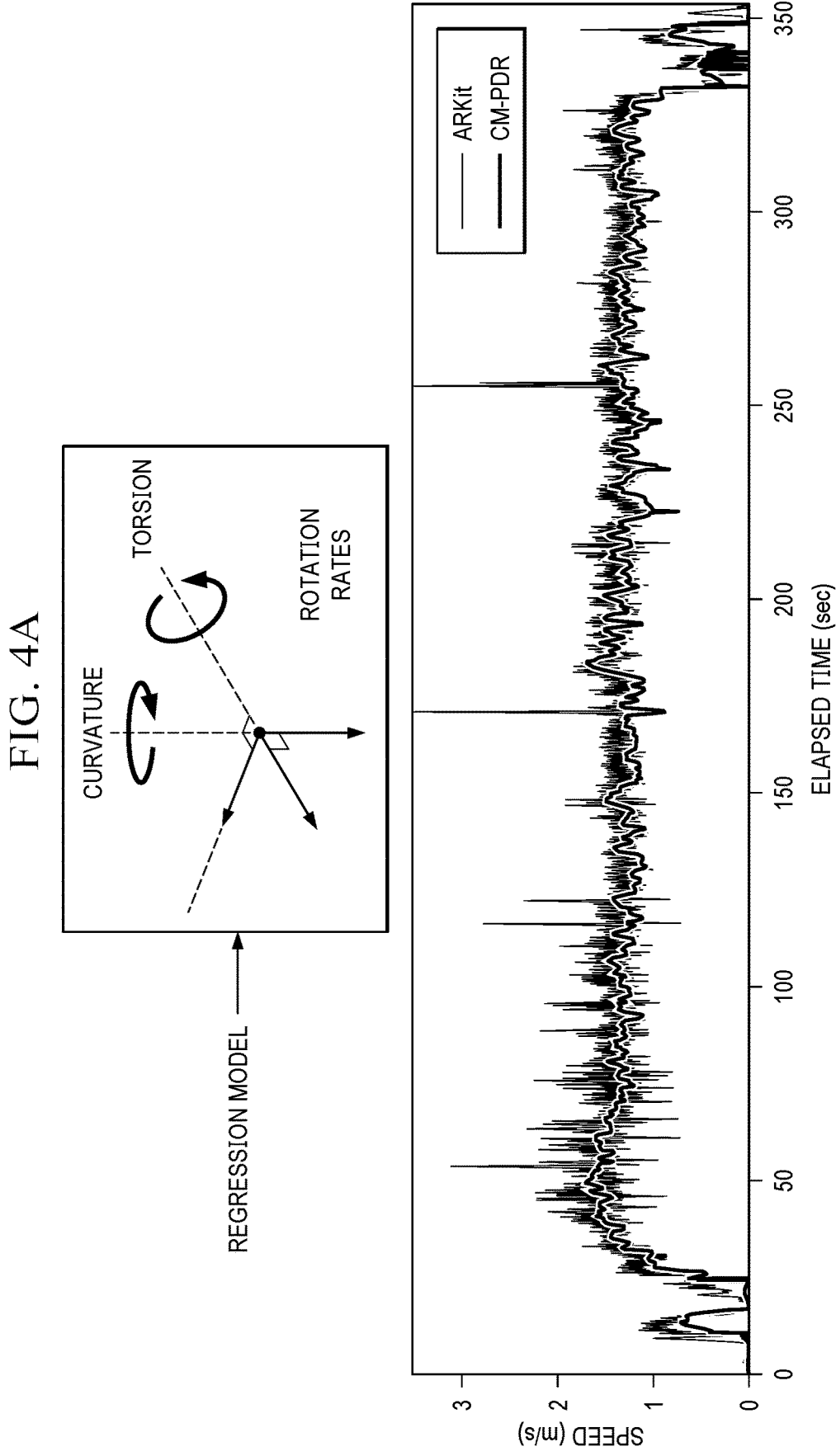
FIGS. 4A and 4B illustrate using geometrical and kinematic properties of TNB reference frames to estimate user speed, according to some embodiments.
Figure 4B:
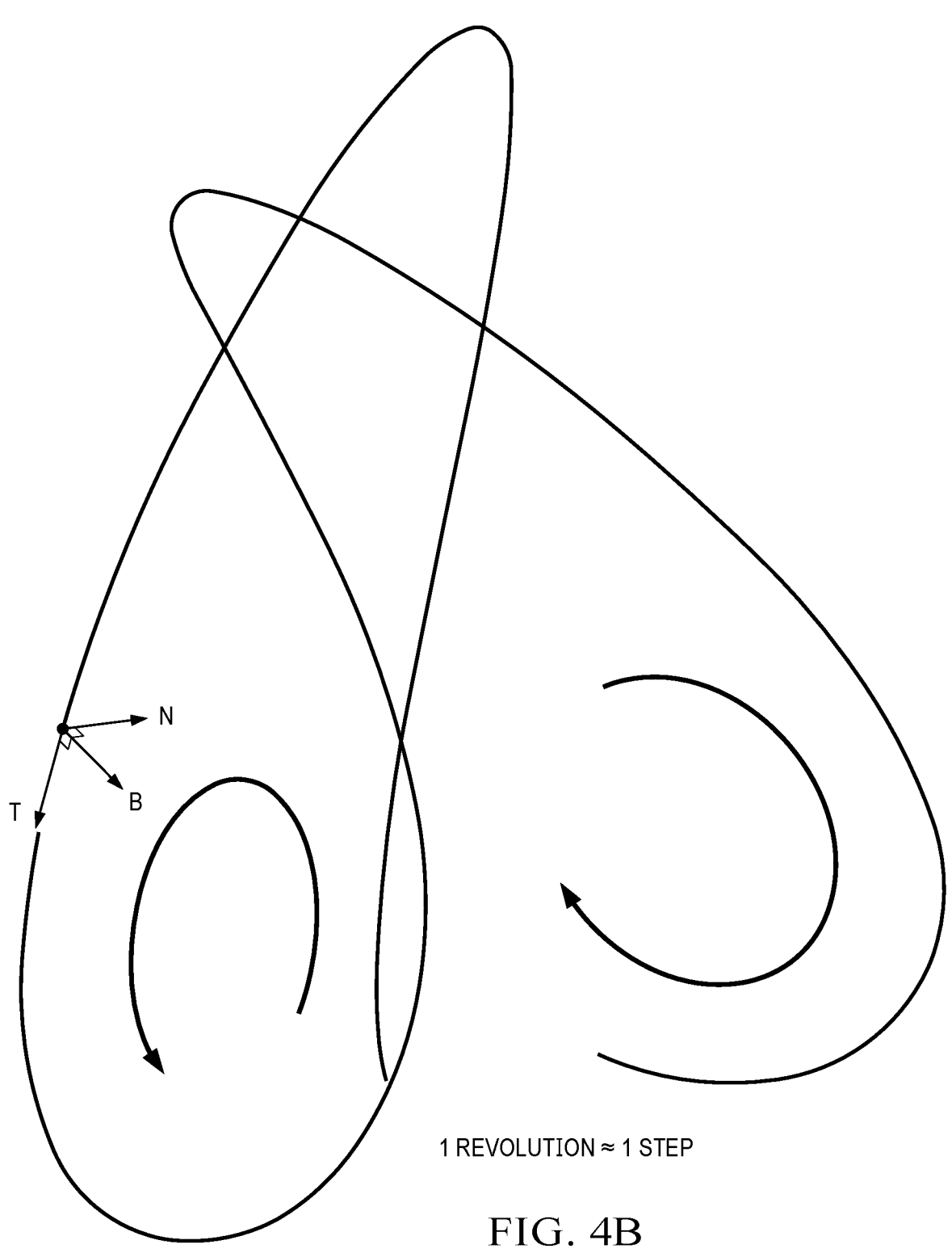

FIG. 4A is a plot illustrating user speed estimation from TNB features using a linear regression model, according to some embodiments. Since a single "butterfly wing" coarsely maps to the period of a single step (see FIG. 4B), the curvature and torsion rotation rates of the TNB reference frames map to stepping speed (see FIG. 4A). In combination with a notion of the arc length of the acceleration space curve, a linear regression model (trained with a set of TNB rotation rates), or other suitable model, can be used to map the curvature and torsion rotation rates to instantaneous user walking speed for each motion data sample. This mapping is inspired by the linear relationship between angular velocity $\omega$ and tangential speed $v$ observed in uniform circular motion and given by:

$$v = R\omega, \qquad [6]$$

where R is a fixed radius from the center of the orbit.

An example linear regression model for k independent variables is given by:

$$\hat{y} = b_0 + b_1 x_1 + b_2 x_2 + \ldots + b_{k-1} x_{k-1} + b_k x_k, \qquad [7]$$

where $\hat{y}$ is the predicted value of the dependent variable, $b_k$ are regression coefficients, and $x_k$ is the value of independent variable k. Equation [7] can be represented in matrix form and solved for the least squares regression coefficients using Equation [8]:

$$b = (X^T X + \lambda I)^{-1} X^T Y \text{ for some small } \lambda > 0, \qquad [8]$$

where $X^T$ is the transpose of X, I is the identity matrix and $\lambda$ is a regularization coefficient to mitigate overfitting of the linear model and promote numerical stability when fitting.

In some embodiments, the linear regression model for estimating user speed from TNB rotation rates is given by:

$$\hat{y} = b_0 + b_1 x_1 + b_2 x_2 + b_3 x_3 + b_4 x_4. \qquad [9]$$

In Equation [9], $\hat{y}$ is the predicted user speed, x1 is a filtered jerk norm, given by:

$$LPF\{\|\dot{a}(t)\|_2\}, \qquad [10]$$

where LPF{ . . . } is the same low-pass filter described above that is used to smooth the lateral sway out of the raw DoT estimates. From the perspective of the space curve, the filtered jerk norm is the smoothed first derivative of arc-length. A larger arc-length results in a larger rate of arc-length change, which results in increased walking speed. It is a smoothed estimate of the local change-in-length of the space curve.

The other three independent variables $\{x_2, x_3, x_5\}$ can be lumped together as follows. The full angular velocity vector of the TNB frame, as it traces the space curve, is referred to as the Darboux angular velocity or Darboux vector. The Darboux vector $\omega$ is constructed via linear combination given by:

$$\omega = \|\dot{a}\|_2 (\tau T + \kappa B), \qquad [11]$$

where $\tau$ is torsion and $\tau T$ describes, in a single axial term, the "roll" of the frame about the unit tangent direction, as defined by T.

Orthogonal to this roll rate is the pitch rate of the TNB frame within its osculating plane: $\kappa B$. Here, the curvature $\kappa$ is defining an instantaneous pitch rate about rotation axis B, which is parallel to the axis of the CoM during stepping, and +90° offset from the stepping direction. The additive combination of mutually orthogonal pitch rate and roll rate terms ($\kappa B$ and $\tau T$, respectively) yields a full 3D angular velocity vector $\omega$. The term $\tau T + \kappa B$ is sufficient for a unit space curve, constrained to be on a unit sphere (e.g., $a(t)/\|a(t)\|_2$). But the butterfly space curve has a time-varying radius from the origin, as defined by $\|a(t)\|$, hence a time-varying arc length:

$$\int_{t_0}^{t} \|\dot{a}(\eta)\| d\eta.$$

For a non-unit space curve, it is customary to scale the Darboux angular velocity by the rate of arc length change, which here is given by jerk norm $\|\dot{a}(t)\|$. In summary, the linear regression model is fit with respect to feature vector:

$$x = [LPF\{\|\dot{a}\|\} \lambda]. \qquad [12]$$

where $\omega = [\omega_1 \ \omega_2 \ \omega_3]^T$ is the Darboux angular velocity vector. Equation [12] is further expanded using Equation [11] as:

$$x = [LPF\{\|\dot{a}\|\} \|\dot{a}\| (\tau T_x + \kappa B_x) \|\dot{a}\| (\tau T_y + \kappa B_y) \|\dot{a}\| (\tau T_z + \kappa B_z)]. \qquad [13]$$

Note that the Darboux angular velocity should not be confused with the angular velocity provided by a gyroscope of the IMU. While the latter captures the rotational velocity of the mobile device (in rad/sec), the former captures the angular velocity (in rad/sample) experienced by the TNB frame as it orbits the smoothed space curve. The gyro readings are different than the Darboux angular velocity vector. For example, since the TNB frame is revolving around the space curve, the Darboux angular velocity vector tends to be more dynamic in its range of rotation rates. For a mobile device to have similar rotation rates measured from its gyro, it would have to be rotating/tumbling in position space.

The example linear regression model described above is one example embodiment of a statistical model to estimate user speed. Other statistical models leveraging other motion features can also be used to estimate user speed. The linear regression model can also have input features other than the Darboux angular velocity vector or other TNB frame properties, such as user height, or stepping frequency, if such data is available (e.g., from a digital pedometer).

Figure 5:
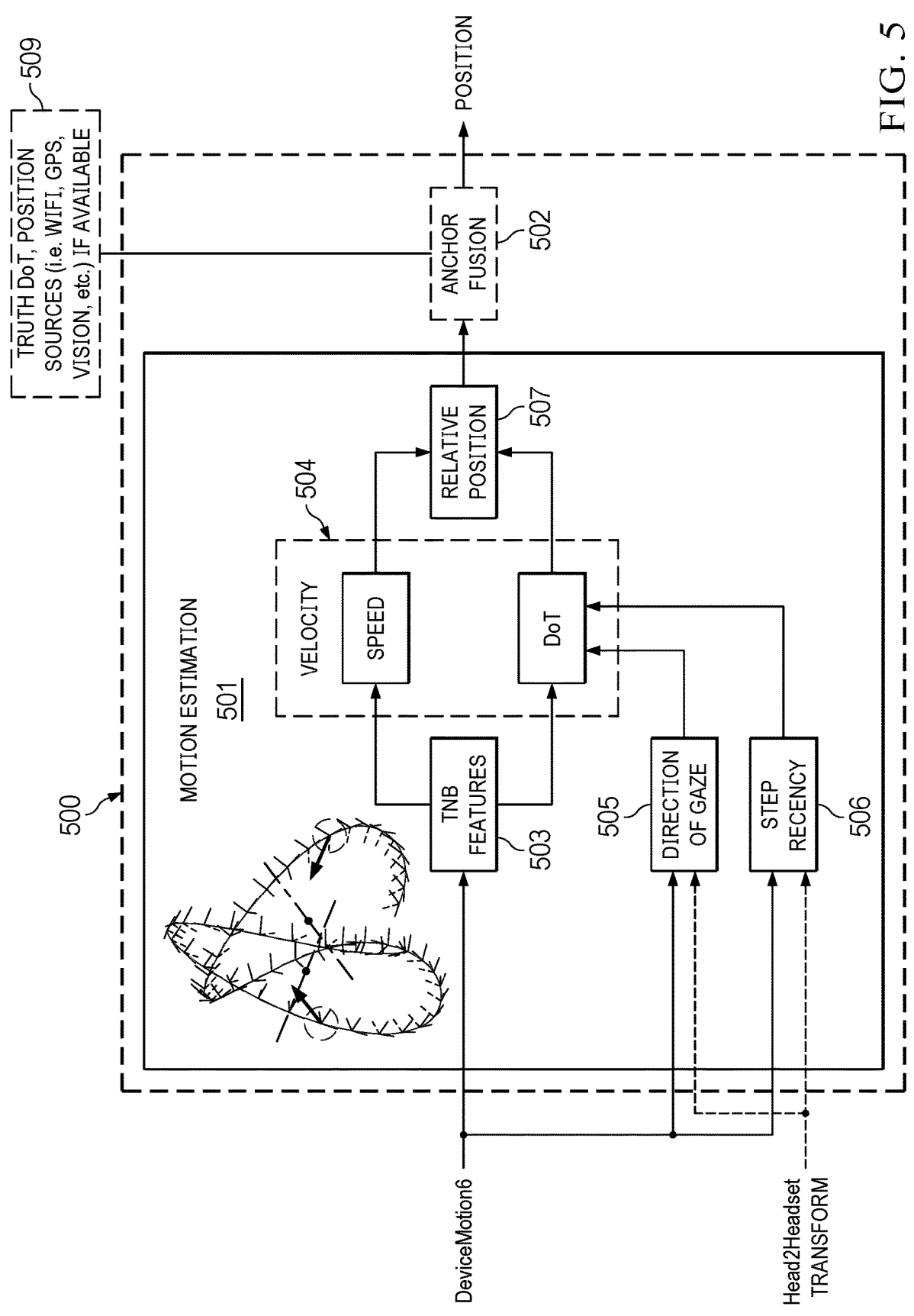
FIG. 5 is a block diagram of a system for determining PDR parameters using geometrical and kinematic properties of TNB frames, according to some embodiments.

FIG. 5 is a block diagram of a system for determining PDR parameters using geometrical and kinematic properties of a TNB frame, according to some embodiments. System 500 includes motion estimation 501 and anchor fusion 502. Motion estimation 501 includes TNB feature generator 503, velocity generator 504, gaze direction generator 505, step recency generator 506 and relative position generator 507.

TNB feature generator 503 generates TNB reference frame features (e.g., unit binormal vector and curvature and torsion rotation rates), as described in reference to FIGS. 2 and 3. The TNB features are input into velocity generator 504 together with a gaze direction vector output from gaze direction generator 505 and step recency value output by step recency generator 506. Since in this example the inertial sensors are embedded in earbuds, the gaze vector is used to transform acceleration data from an Earbud body reference frame into a head reference frame.

Velocity generator 504 rotates binormal unit vectors by 90 degrees in the horizontal (X-Y) plane to generate raw DoT vectors which are smoothed using a LPF to generate the smoothed DoT vectors 303 shown in FIG. 3A. The smoothed DoT vectors are then averaged to provide the DoT of the user. Velocity generator 504 also uses a linear regression model to estimate user speed from the curvature and torsion rotation rates, as described in reference to FIGS. 4A and 4B. The estimated user speed and DoT are combined into a velocity vector which is output from velocity generator 504. The velocity vector is integrated by relative position generator 507 into a relative position vector. The relative position vector is optionally fused with truth data, such as truth DoT data from a face tracker and/or position sources (e.g., WIFI, GPS, Vision) to generate an anchored position (e.g., geographic location) of the user.

Note that in some situations where the butterfly space curve is not available, the user's gaze direction vector generated by gaze direction generator 505 can be used instead of, or combined/fused with, the smoothed DoT vectors in the LPF.

In some embodiments, weights are used to determine the contributions of the raw DoT vector and the gaze direction vector to DoT based on the step recency value (e.g., an elapsed time since last step was detected) generated by step recency generator 506. For example, if a specified amount of time t has elapsed since the last step was detected based on motion data (e.g., acceleration data), then the gaze direction vector is weighted more heavily in the LPF than the smoothed DoT vector.

In some embodiments, the gaze direction vector is low-pass filtered. The raw DoT vector (with sway) is also lowpass filtered to remove sway. Both are filtered independently using, for example, a Butterworth IIR filter. These two smoothed directionality estimates-one from gaze/attitude, and one from the butterfly via TNB—are then fused using a weighted combination of the two smoothed quantities. The relative weighting of one directionality vector over the other is based on whether a person is walking. When confidence that the user is walking/ambulating is low, the TNB derived estimates are weighted less in the fusion (e.g., the Butterfly space curve may be deformed or not present at all). In such situations, the gaze direction vector is used for DoT estimation-mapping coarsely to a user's "intended" walking direction. In some embodiments, a step detector can be used to inform this weighting factor. The step recency indicates when the influence of the TNB-derived estimate is up-weighted during fusion. Conversely, the absence of recently detected steps would trigger an up-weight of the relative contribution of the gaze direction vector to the fused DoT result.

Example Process

FIG. 6 is a flow diagram of a process for determining PDR parameters using geometrical and kinematic properties of a moving TNB frame, as described in reference to FIGS. 1-5. Process 600 can be implemented by, for example, the device architecture 700 described in reference to FIG. 7.

Process 600 includes the steps of: receiving acceleration data in an inertial reference frame from a motion sensor (e.g., IMU) of a mobile device carried by a user (601). In some embodiments, the acceleration data is inertial acceleration with gravity removed. The acceleration data is represented by a space curve in a three-dimensional (3D) acceleration space, where the space curve is indicative of a cyclical vertical oscillation of the user's CoM accompanied by a lateral left and right sway of the CoM when the user is stepping.

Process 600 continues by computing a TNB reference frame from the acceleration data (602). The TNB reference frame describes instantaneous geometric properties of the acceleration space curve over time, wherein the T vector of the TNB reference frame is tangent to the space curve, the N vector of the TNB reference frame is a normalized derivative of the unit T vector and a the B vector of the TNB reference frame is formed from a cross-product of the T vector and the N vector. Process 600 continues by computing a DoT of the user based on an orientation of the B unit vector in the 3D acceleration space (603). Each step of process 600 was previously described in detail in reference to FIGS. 1-5.

Example Device Architecture

Figure 7:
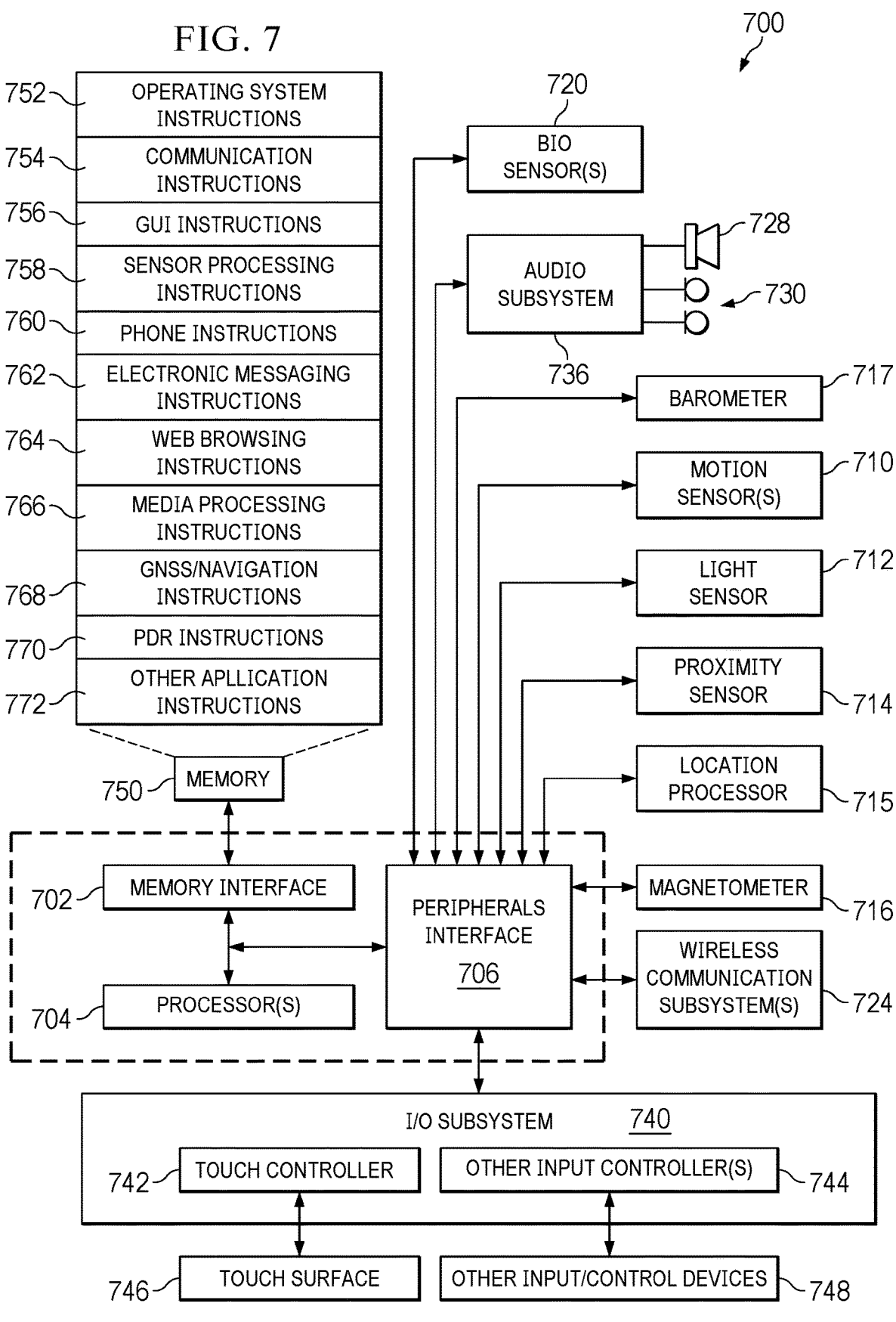
FIG. 7 is a block diagram of a device architecture for implementing the features and processes described in reference to FIGS. 1-6.

FIG. 7 is block diagram of a device architecture 700 for implementing the features and processes described in reference to FIGS. 1-6. Architecture 700 can include memory interface 702, one or more hardware data processors, image processors and/or processors 704 and peripherals interface 706. Memory interface 702, one or more processors 704 and/or peripherals interface 706 can be separate components or can be integrated in one or more integrated circuits. System architecture 700 can be included in any suitable electronic device, including but not limited to: a smartwatch, smartphone, fitness band and any other device that can be attached, worn or held by a user.

Sensors, devices and subsystems can be coupled to peripherals interface 706 to provide multiple functionalities. For example, one or more motion sensors 710, light sensor 712 and proximity sensor 714 can be coupled to peripherals interface 706 to facilitate motion sensing (e.g., acceleration, rotation rates), lighting and proximity functions of the wearable device. Location processor 715 can be connected to peripherals interface 706 to provide geo-positioning. In some implementations, location processor 715 can be a GNSS receiver, such as the Global Positioning System (GPS) receiver. Electronic magnetometer 716 (e.g., an integrated circuit chip) can also be connected to peripherals interface 706 to provide data that can be used to determine the direction of magnetic North. Electronic magnetometer 716 can provide data to an electronic compass application. Motion sensor(s) 710 can include one or more accelerometers and/or gyros configured to determine change of speed and direction of movement. Barometer 717 can be configured to measure atmospheric pressure. Bio signal sensor 720 can be one or more of a PPG sensor, an electroencephalogram (EEG) sensor, an electrocardiogram (ECG) sensor, an electromyogram (EMG) sensor, a mechanomyogram (MMG) sensor (e.g., piezo resistive sensor) for measuring muscle activity/contractions, an electrooculography (EOG) sensor, a galvanic skin response (GSR) sensor, a magneto-encephalogram (MEG) sensor and/or other suitable sensor(s) configured to measure bio signals.

Communication functions can be facilitated through wireless communication subsystems 724, which can include radio frequency (RF) receivers and transmitters (or transceivers) and/or optical (e.g., infrared) receivers and transmitters. The specific design and implementation of the communication subsystem 724 can depend on the communication network(s) over which a mobile device is intended to operate. For example, architecture 700 can include communication subsystems 724 designed to operate over a GSM network, a GPRS network, an EDGE network, a Wi-Fi™ network and a Bluetooth™ network. In particular, the wireless communication subsystems 724 can include hosting protocols, such that the mobile device can be configured as a base station for other wireless devices.

Audio subsystem 736 can be coupled to a speaker 728 and a microphone 30 to facilitate voice-enabled functions, such as voice recognition, voice replication, digital recording and telephony functions. Audio subsystem 736 can be configured to receive voice commands from the user.

I/O subsystem 740 can include touch surface controller 742 and/or other input controller(s) 744. Touch surface controller 742 can be coupled to a touch surface 746. Touch surface 746 and touch surface controller 742 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 746. Touch surface 746 can include, for example, a touch screen or the digital crown of a smart watch. I/O subsystem 740 can include a haptic engine or device for providing haptic feedback (e.g., vibration) in response to commands from processor 704. In an embodiment, touch surface 746 can be a pressure-sensitive surface.

Other input controller(s) 744 can be coupled to other input/control devices 748, such as one or more buttons, rocker switches, thumb-wheel, infrared port and USB port. The one or more buttons (not shown) can include an up/down button for volume control of speaker 728 and/or microphone 730. Touch surface 746 or other controllers 744 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 746; and a pressing of the button for a second duration that is longer than the first duration may turn power to the mobile device on or off. The user may be able to customize a functionality of one or more of the buttons. The touch surface 746 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 702 can be coupled to memory 750. Memory 750 can include high-speed random access memory and/or non-volatile memory, such as one or more magnetic disk storage devices, one or more optical storage devices and/or flash memory (e.g., NAND, NOR). Memory 750 can store operating system 752, such as the iOS operating system developed by Apple Inc. of Cupertino, California. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers, such as, for example, instructions for implementing a software stack for wired or wireless communications with other devices. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Location instructions 768 to facilitate generic GNSS and location-related processes and instructions; and PDR instructions 770 that implement the PDR processes described in reference to FIGS. 1-6. Memory 750 further includes other application instructions 772 including but not limited to instructions for applications that utilize PDR parameters (e.g., navigation applications).

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
receiving, with at least one processor, acceleration data in an inertial frame of reference, the acceleration data output from a motion sensor of a mobile device carried by a user, the acceleration data represented by a space curve in a three-dimensional (3D) acceleration space, the space curve indicative of a cyclical vertical displacement of a center of mass of the user accompanied by a lateral left sway and a lateral right sway of the center of mass when the user is stepping;
computing, with the at least one processor, a tangent-normal-binormal (TNB) reference frame from the acceleration data, the TNB reference frame describing instantaneous geometric properties of the space curve over time, wherein a unit tangent (T) vector of the TNB reference frame is tangent to the space curve, a unit normal (N) vector of the TNB reference frame is a normalized derivative of the T vector and a unit binormal (B) vector of the TNB reference frame is formed from a cross-product of the T vector and the N vector; and
computing, with the at least one processor, a direction of travel of the user based on an orientation of the B vector in the 3D acceleration space.

2. The method of claim 1 further comprising:
smoothing, with the at least one processor, the acceleration data prior to computing the TNB reference frame.

3. The method of claim 2, wherein the acceleration data is smoothed by a low-pass filter.

4. The method of claim 1, wherein computing the direction of travel further comprises:
rotating, with the at least one processor, the unit binormal vector by 90 degrees in a horizontal plane of the inertial frame of reference.

5. The method of claim 1, wherein the TNB reference frame possesses kinematic properties and the method further comprises:
estimating, with the at least one processor, speed of the user based on a statistical model applied to the kinematic properties of the TNB reference frame.

6. The method of claim 5, wherein the kinematic properties include a curvature rotation rate that indicates in-plane rotation rates of the space curve.

7. The method of claim 5, wherein the kinematic properties include a torsion rotation rate that indicates out-of-plane roll rotation of the space curve.

8. A system comprising:
at least one motion sensor;
at least one processor;
memory storing instructions that when executed by the at least one processor, cause the at least one processor to perform operations comprising:
receiving acceleration data from the at least one motion sensor of a mobile device carried by a user, the acceleration data represented by a space curve in a three-dimensional (3D) acceleration space, the space curve indicative of a cyclical vertical displacement of a center of mass of the user accompanied by a lateral left sway and a lateral right sway of the center of mass when the user is stepping;
computing a tangent-normal-binormal (TNB) reference frame from the acceleration data, the TNB reference frame describing instantaneous geometric properties of the space curve over time, wherein a unit tangent (T) vector of the TNB reference frame is tangent to the space curve, a unit normal (N) vector of the TNB reference frame is a normalized derivative of the T vector and a unit binormal (B) vector of the TNB reference frame is formed from a cross-product of the T vector and the N vector; and computing a direction of travel of the user based on an orientation of the B vector in the 3D acceleration space.

9. The system of claim 8, wherein the operations further comprise:

smoothing the acceleration data prior to computing the TNB reference frame.

10. The system of claim 9, wherein the acceleration data is smoothed by a low-pass filter.

11. The system of claim 8, wherein computing the direction of travel further comprises:

rotating the binormal unit vector by 90 degrees in a horizontal plane of an inertial frame of reference.

12. The system of claim 8, wherein the TNB reference frame possesses kinematic properties and the operations further comprise:

estimating a speed of the user based on a statistical model applied to the kinematic properties.

13. The system of claim 12, wherein the statistical model is a linear regression model and the kinematic properties include rotation rates of the TNB reference frame.

14. The system of claim 13, wherein the kinematic properties include a curvature rotation rate that indicates in-plane rotation rates of the space curve.

15. The system of claim 13, wherein the kinematic properties include a torsion rotation rate that indicates out-of-plane roll rotation of the space curve.

16. The system of claim 8, wherein the system is embedded in at least one earbud worn in an ear of the user.

* * * * *